US007054383B2

(12) United States Patent
Lorenzen et al.

(10) Patent No.: US 7,054,383 B2
(45) Date of Patent: May 30, 2006

(54) METHOD FOR THE DETERMINATION OF THE AVERAGE LONG-TERM POWER OF DIGITAL MODULATED SIGNAL

(75) Inventors: Rolf Lorenzen, Unterhaching (DE); Ralf Plaumann, Preisendorf (DE)

(73) Assignee: Rohde & Schwarz GmbH & Co. KG, München (DE)

( * ) Notice: Subject to any disclaimer, the term of this patent is extended or adjusted under 35 U.S.C. 154(b) by 770 days.

(21) Appl. No.: 10/203,353

(22) PCT Filed: Apr. 3, 2001

(86) PCT No.: PCT/EP01/03792

§ 371 (c)(1),
(2), (4) Date: Aug. 9, 2002

(87) PCT Pub. No.: WO01/94957

PCT Pub. Date: Dec. 13, 2001

(65) Prior Publication Data

US 2003/0012296 A1    Jan. 16, 2003

(30) Foreign Application Priority Data

Jun. 2, 2000    (DE) .............................. 100 27 388

(51) Int. Cl.
*H04L 27/04*    (2006.01)
*H04L 27/12*    (2006.01)
*H04L 27/20*    (2006.01)

(52) U.S. Cl. ...................... 375/295; 375/297
(58) Field of Classification Search ................ 375/295, 375/297

See application file for complete search history.

(56) References Cited

U.S. PATENT DOCUMENTS

| 5,507,015 | A | * | 4/1996 | Karczewski et al. ........ 455/116 |
| 6,041,076 | A | | 3/2000 | Franchville et al. |
| 6,070,086 | A | * | 5/2000 | Dobrica ...................... 455/522 |
| 6,272,172 | B1 | | 8/2001 | Deshpande et al. |

FOREIGN PATENT DOCUMENTS

| DE | 44 30 349 A1 | 2/1996 |
| DE | 199 10 902 A1 | 10/1999 |
| DE | 199 55 564 A1 | 5/2000 |

* cited by examiner

*Primary Examiner*—Stephen Chin
*Assistant Examiner*—Jia Lu
(74) *Attorney, Agent, or Firm*—Ditthavong & Carlson, P.C.

(57) ABSTRACT

A method and system for determining the average long-term is described, in which a short-term power of a segment of the input signal is determined and a data sequence is produced that is contained in the segment and with which the input signal is modulated. A reference signal is produced by modulation with the data sequence at a predetermined reference control factor of a modulator, in which a long-term power of the reference signal corresponds to the reference control factor, and a short-term power of the reference signal within the segment is determined. A correction value is determined by comparing the short-term power of the reference signal with the long-term power of the reference signal corresponding to the reference control factor; and the short-term power of the segment of the input signal is corrected based on the correction value in order to obtain the long-term power of the input signal.

11 Claims, 2 Drawing Sheets

METHOD FOR THE DETERMINATION OF THE AVERAGE LONG-TERM POWER OF DIGITAL MODULATED SIGNAL

FIELD OF THE INVENTION

The invention relates to a method for determining the average long-term power of a digitally modulated signal.

BACKGROUND OF THE INVENTION

A digitally modulated signal for mobile telephony, in particular for GSM, usually consists of individual transmission blocks (bursts) which are modulated by an in-phase component I and a complementary-phase component Q. The modulation is carried out, for example, as 8 PSK.

When measuring the power of such a signal, the problem arises that the power measured within the measurement interval is dependent on the modulation data. However, it is in fact the average long-term power averaged over a theoretically infinite time interval which is of interest. In order to find this long-term power, it has hitherto been customary to measure a very large number of transmission blocks (bursts) and to average the measured signal accordingly. However, this entails relatively long measurement times and is therefore disadvantageous.

There exists therefore a need to provide a method for determining the average long-term power of a digitally modulated signal, which permits measurement in just one transmission block (burst) within a relatively short measurement interval.

SUMMARY OF THE INVENTION

The invention stems from the discovery that a short-term measurement within a relatively short time interval is sufficient for determining the long-term power if the data content within the measured time segment is determined and the measured power is corrected as a function of this data content. Accordingly, the data sequence contained in the measured segment of the input signal is produced, for example by demodulation, and a modulator is driven with a predetermined reference control factor by using this data sequence, the average long-term power of the reference signal corresponding to the reference control factor being known. If the short-term power of the reference signal in relation to the data content is determined in the time segment, then a correction value is obtained with which the measured short-term power of the input signal can be corrected.

The average long-term power of the reference signal is preferably determined by modulation with a statistical data sequence at the reference control factor. This determination of the long-term power at the reference control factor only needs to be carried out once and can then be stored as a fixed value.

In the simplest case, the data sequence which is contained in the time segment of the input signal is determined by demodulating the input signal. The GSM signal usually has a specific reference sequence with 26 symbols in the middle of the transmission block (burst). The number of different reference sequences is limited. If the power measurement is carried out in the vicinity of this reference sequence, then it is possible to determine by comparison, optionally without demodulation, which reference sequence exists in the measured burst. The data content of the reference sequence is then known.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

Exemplary embodiments of the invention will be explained in more detail below with reference to the drawing. In the drawings.

DESCRIPTION OF THE PREFERRED EMBODIMENT

Figure 1:
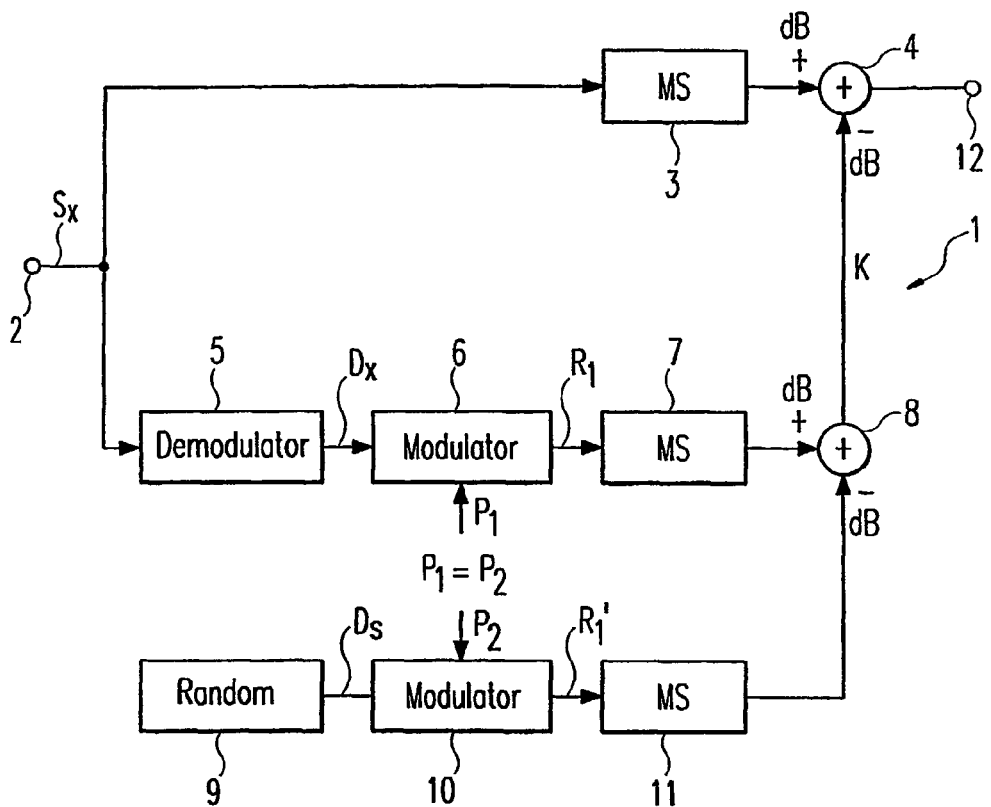
FIG. 1 shows a first exemplary embodiment of a block diagram for carrying out the method according to the invention.

Before discussing the exemplary embodiment which is represented in FIG. 1, an example of a transmission block (burst) in GSM format will first be explained with reference to FIG. 2. The signal level is represented on a logarithmic scale as a function of the time, which is scaled in symbol intervals. The burst, consisting of a total of 147 symbols, is divided into a first data sequence D1 a reference sequence R and a second data sequence D2. Because of the IQ modulation, the amplitude of the signal is subject to relatively large fluctuations. In the example which is represented, these fluctuations amount to approximately 15 dB.

Whereas the data in the two data sequences D1 and D2 is arbitrary, a reference sequence R, which is selected from a limited set of reference sequences, is carried over 26 symbols in the middle of the burst.

Figure 2:
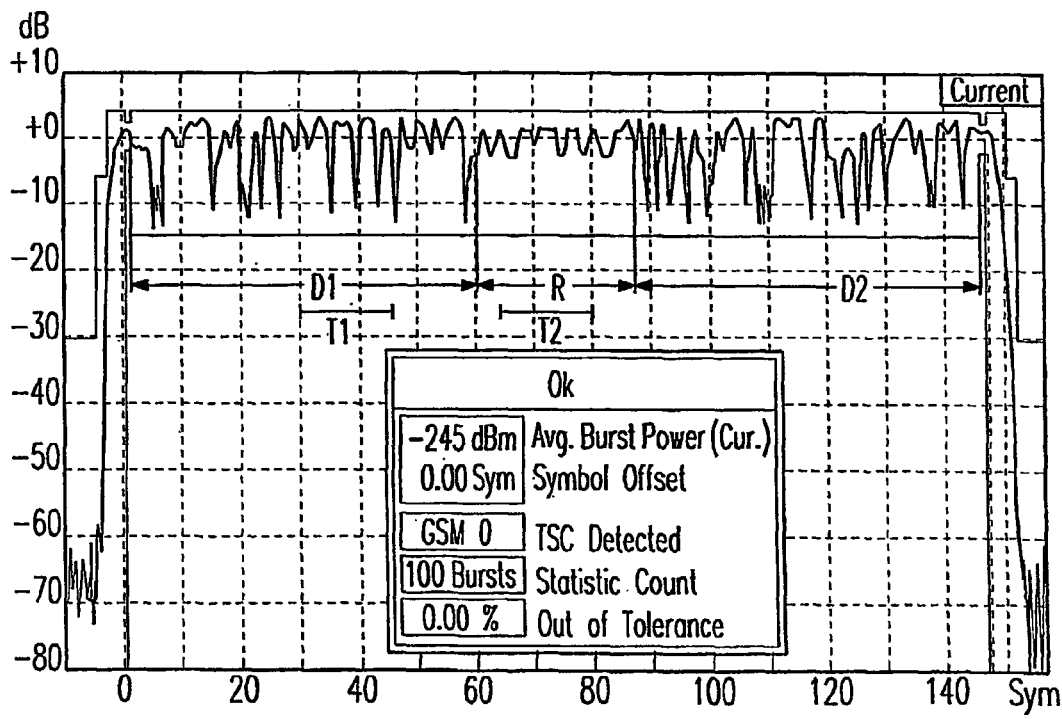
FIG. 2 shows an example of a transmission block (burst)

The problem when carrying out a power measurement on the signal represented in FIG. 2 is that, because of the amplitude fluctuations due to the modulation, the power measured within a time window that lies within the burst is dependent on the data content which is transmitted during this time interval. For the measurement, however, it is the average long-term power, independent of the data content, which is of interest. In order to find this, it has hitherto been customary to measure and then average the power within a very large number of bursts. Since the measurement accuracy is proportional to the square root of the individual measurements, a very large number of individual measurements are necessary in order to achieve a satisfactory measurement accuracy. This entails a relatively long overall measurement time.

Accordingly, the short-term power measured is weighted within a time segment T1 or T2 with a correction factor that is dependent on the data content with which the signal has been modulated during the time segment.

The input signal $S_x$ to be measured is delivered to an input terminal 2 of a measuring instrument 1 which is schematically represented in FIG. 1. The input signal $S_x$ is a digital sample signal. In a first averaging unit 3, the mean value of the input signal $S_x$ to be measured is formed within the measured time segment. The measured time segment is indicated by way of example in FIG. 2 as T1 for a measurement within the data sequence $D_1$ and as T2 for a measurement within the reference sequence R. The mean power is calculated by taking the square of all the sample values, adding the squared sample values and dividing by the number of sample values (MS=mean square). If it is not the mean power but the mean amplitude which is of interest, the square root may also be taken (RMS=root mean square). The output of the first averaging unit 3 is delivered to the +terminal of a first subtraction unit 4.

In order to find the data content within the measured time segment T1 or T2, the input signal $S_x$ is delivered to a demodulator 5. The data sequence $D_X$ modulating the input signal $S_x$ within the segment T1 or T2 is provided at the output of the demodulator 5, and it is delivered to a first modulator 6. The modulator 6 is operated using a constant, predetermined reference control factor $P_1$. This reference control factor $P_1$ is known. In order to determine the power of the reference signal $R_1$ which is modulated using the modulator 6, a second averaging unit 7 is used which is connected to the output of the first modulator 6. The power of the reference signal $R_1$ is modulated by squaring and averaging the squared amplitudes within the segment T1 or T2 (MS=mean square).

The output of the second averaging unit 7 is delivered to the +terminal of a second subtraction unit 8. The second subtraction unit 8 compares the data-dependent short-term power of the reference signal $R_1$ with a data-independent long-term power of the reference signal $R_1$. To that end, a reference signal $R_1'$ is produced using statistical data $D_S$ over a very long measurement interval. This is schematically represented in FIG. 1 by the fact that the output of a statistical data source 9 is delivered to a second modulator 10, which is operated with a control factor $P_Z$ that corresponds exactly to the control factor $P_1$ of the first modulator 6. The output of the second modulator 10 is delivered to a third averaging unit 11, which in turn squares the sample values, takes the sum and divides by the number of sample values (MS=mean square), so that the mean long-term power of the reference signal $R_1'$ modulated with the statistical data $D_S$ is provided at the output of the third averaging unit 11. The thus found mean power of the reference signal at the control factor $P_1=P_z$ is constant, so that the method steps described with reference to the block diagram elements 9 to 11 only need to be carried out once, and the resulting constant value can be stored.

The output of the third averaging unit 11 is delivered to the −terminal of the second subtraction unit 8. At the output of the second subtraction unit 8, a correction value K is obtained which is positive when, because of the data modulation, the short-term power measured for the reference level $R_1$ is greater than the long-term power to be expected with statistical data DS, and which is negative when, because of the data modulation, the measurement interval involves a lower power than is to be expected for a long-term measurement with statistical data $D_S$. It should also be pointed out that the averaging units 7 and 11 form the output level on a logarithmic scale, which is indicated by the symbol "dB". For this reason, subtraction rather than division of the output signals is required. If the averaging units 11 and 7 provide output levels on a linear scale, then the subtraction unit 8 must be replaced by a division unit. The correction value K is likewise scaled logarithmically, and it is delivered to the −terminal of the first subtraction unit 4, the correction value K being subtracted from the power measured within the segment T1 or T2. If the data content gives rise to a positive deviation from the long-term power to be expected for the modulation with statistical data DS, then the measured short-term power will correspondingly be corrected downwards. Conversely, the measured short-term power will be corrected upwards if, because of the data sequence $D_X$ contained in the measurement interval, a negative deviation is encountered from the long-term power for modulation with statistical data $D_S$.

A method according to the invention is represented as a block diagram in FIG. 1. Nevertheless, the method according to the invention need not be carried out using circuit technology (as hardware), but may also be fully implemented by program steps (as software). The measured and corrected power is provided at the output 12.

Figure 3:
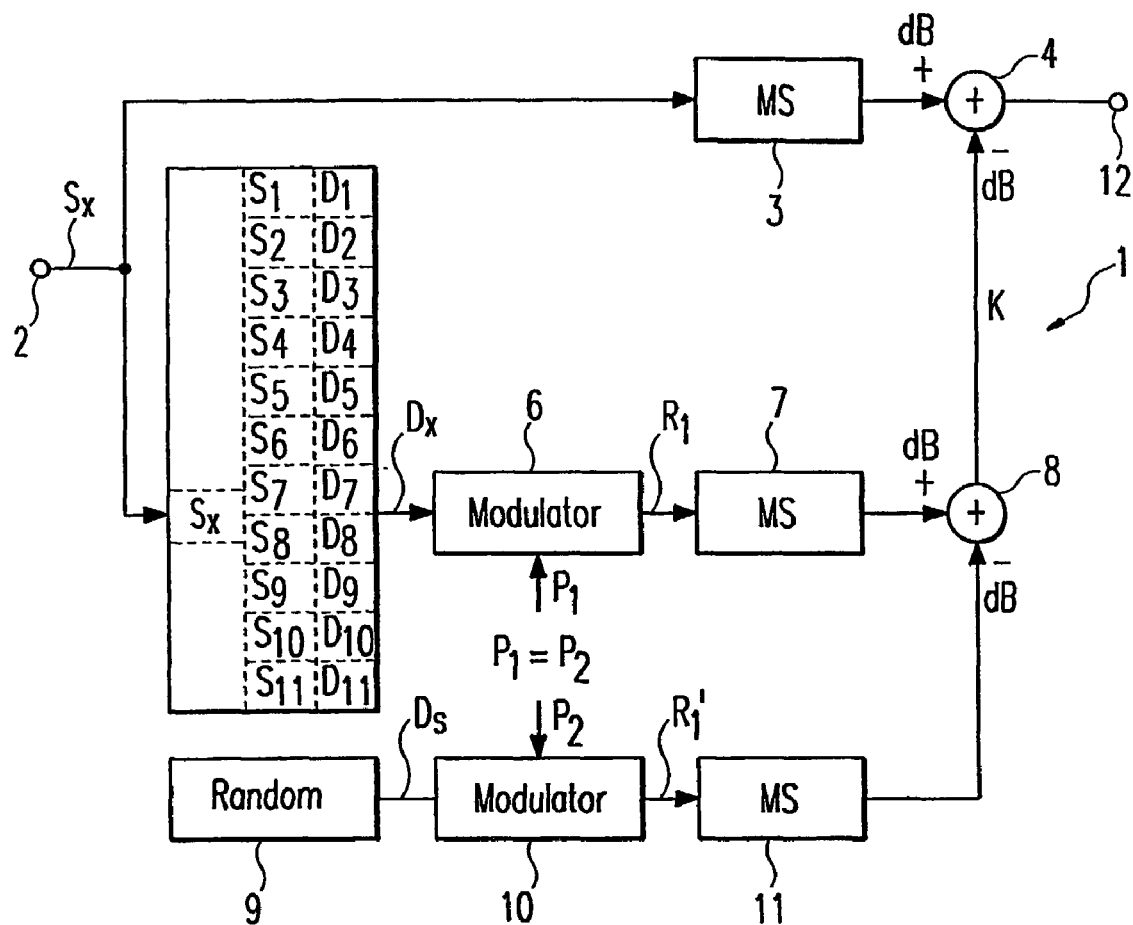
FIG. 3 shows a second exemplary embodiment of a block diagram for carrying out the method according to the invention.

In particular, the exemplary embodiment represented in FIG. 1 is suitable for a measurement interval T1 within the two data sequences $D_1$ and D2, when nothing is known about the data content within the measurement interval. If, however, measurement is carried out within the reference sequence R in the middle of the burst, which is indicated in FIG. 2 by the segment T2, then demodulation is not necessarily required if the reference sequence R is selected from a limited number of possible reference sequences. In that case, it is possible to compare the input signal within the measurement interval with the possible reference signals, without demodulation being required. Such an exemplary embodiment is represented in FIG. 3 as a schematic block diagram. Elements which have already been described with reference to FIG. 1 are provided with matching references, so that a repeat description is in this respect unnecessary.

The input signal $S_X$ within the measurement interval is compared with possible signal waveforms $S_1$ to $S_{11}$, for example by correlation. The signal $S_1$ to S11 which has the best match with the input signal $S_X$ is selected, and the modulation data $D_1$ to D11 corresponding to this signal is delivered to the modulator 6. Under certain circumstances, such a comparison may be carried out more rapidly than demodulation, and demodulation errors are avoided.

While the present invention has been described in connection with a number of embodiments and implementations, the present invention is not so limited but covers various obvious modifications and equivalent arrangements, which fall within the purview of the appended claims.

The invention claimed is:

1. A method for determining an average long-term power of a digitally modulated input signal comprising:
    determining a short-term power of a segment of the input signal;
    producing a data sequence that is contained in the segment and with which the input signal is modulated;
    producing a reference signal by modulation with the data sequence that is contained in the segment at a predetermined reference control factor of a modulator, a long-term power of the reference signal corresponding to the reference control factor;
    determining a short-term power of the reference signal within the segment;
    determining a correction value by comparing the short-term power of the reference signal with the long-term power of the reference signal corresponding to the reference control factor; and
    correcting the short-term power of the segment of the input signal based on the correction value in order to obtain the long-term power of the input signal.

2. A method according to claim 1, wherein the long-term power of the reference signal is formed by modulation with a statistical data sequence at the reference control factor and averaging over an extended time period.

3. A method according to claim 2, wherein the long-term power of the reference signal is formed once and is stored in a memory.

4. A method according to claim 1, wherein the data sequence that is contained in the segment of the input signal is produced by demodulating the input signal.

5. A method according to claim 1, wherein the data sequence that is contained in the segment of the input signal is produced by comparing the input signal with comparison signals that are modulated with different data sequences.

6. An article of manufacture bearing software for causing a computer to perform the method according to claim 1.

7. A system for determining an average long-term power of a digitally modulated input signal comprising:
  a first averaging unit for determining a short-term power of a segment of the input signal;
  a demodulator for producing a data sequence that is contained in the segment and with which the input signal is modulated;
  a modulator for producing a reference signal based on the data sequence that is contained in the segment at a predetermined reference control factor, a long-term power of the reference signal corresponding to the reference control factor;
  a second averaging unit for determining a short-term power of the reference signal within the segment;
  means for determining a correction value by comparing the short-term power of the reference signal with the long-term power of the reference signal corresponding to the reference control factor; and
  a subtraction unit for correcting the short-term power of the segment of the input signal based on the correction value in order to obtain the long-term power of the input signal.

8. A system according to claim 7, wherein the long-term power of the reference signal is formed by modulation with a statistical data sequence at the reference control factor and averaging over an extended time period.

9. A system according to claim 8, further comprising a memory for storing the long-term power of the reference signal.

10. A system according to claim 7, wherein the data sequence that is contained in the segment of the input signal is produced by demodulating the input signal.

11. A system according to claim 7, wherein the data sequence that is contained in the segment of the input signal is produced by comparing the input signal with comparison signals that are modulated with different data sequences.

* * * * *